US012608393B1

(12) United States Patent
Balogun et al.

(10) Patent No.: US 12,608,393 B1
(45) Date of Patent: Apr. 21, 2026

(54) SYSTEMS AND METHODS FOR DATA MIGRATION

(71) Applicant: Massachusetts Mutual Life Insurance Company, Springfield, MA (US)

(72) Inventors: Sherriff Balogun, Springfield, MA (US); Manivannan Solairaj, Springfield, MA (US); Krishnan Ramamoorthy, Springfield, MA (US); Mark Buffone, Springfield, MA (US); Michael Crough, Springfield, MA (US); Vlad Bura, Springfield, MA (US); Liana Sirb, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 18/460,035

(22) Filed: Sep. 1, 2023

Related U.S. Application Data

(60) Provisional application No. 63/403,594, filed on Sep. 2, 2022.

(51) Int. Cl.
| | |
|---|---|
| *G06F 17/00* | (2019.01) |
| *G06F 7/00* | (2006.01) |
| *G06F 11/34* | (2006.01) |
| *G06F 16/21* | (2019.01) |
| *G06F 16/25* | (2019.01) |
| *G06Q 40/08* | (2012.01) |

(52) U.S. Cl.
CPC ........ *G06F 16/254* (2019.01); *G06F 11/3457* (2013.01); *G06F 16/214* (2019.01); *G06F 16/258* (2019.01); *G06Q 40/08* (2013.01)

(58) Field of Classification Search
CPC .... G06F 16/254; G06F 16/214; G06F 16/258; G06F 11/3457; G06Q 40/08
USPC ......................................................... 707/602
See application file for complete search history.

(56) References Cited

U.S. PATENT DOCUMENTS

| | | | | |
|---|---|---|---|---|
| 8,447,863 | B1 * | 5/2013 | Francis, Jr. ......... | G06F 16/2468 709/227 |
| 2010/0039682 | A1 * | 2/2010 | Peot ................... | H04N 1/00795 358/474 |
| 2010/0131900 | A1 * | 5/2010 | Spetalnick ............ | G06F 3/0237 345/169 |

(Continued)

*Primary Examiner* — Pavan Mamillapalli
(74) *Attorney, Agent, or Firm* — Foley & Lardner LLP

(57) ABSTRACT

A system incorporates a platform for analysis of electronic files relating to an old insurance policy using computer protocols such as visual analytics tools to identify attributes of the insurance policy. A policy migration process automates typically complex custom migrations in a methodical workflow employing a simplified metrics-driven process. Layers of a data migration and policy transformation workflow include source policies layer, normalization layer, and target policies layer. The normalization layer includes an extraction, transformation, and loading (ETL) engine. The ETL engine inputs configuration files that incorporate mapping rules for mapping source policies to normalized values within a data dictionary. Systems of the disclosure incorporate built-in personas that cater migration features to a specific set of migration execution team roles such as policy edit and QA. A cloud-based policy migration model includes a UI for inputs by migration team members, and back end components including the ETL engine.

10 Claims, 8 Drawing Sheets

(56)             References Cited

U.S. PATENT DOCUMENTS

2010/0223214 A1\*   9/2010  Kirpal ..................... G06F 16/86
                                                706/12
2011/0066937 A1\*   3/2011  Loeser ................... G06F 16/93
                                                715/241
2015/0317610 A1\*  11/2015  Rao ........................ G06F 40/10
                                                705/321
2019/0370233 A1\*  12/2019  Yamashita ............ G06F 16/254
2022/0197796 A1\*   6/2022  Rumanek .............. G06F 16/215
2023/0298368 A1\*   9/2023  Berger ................. G06V 30/414

\* cited by examiner

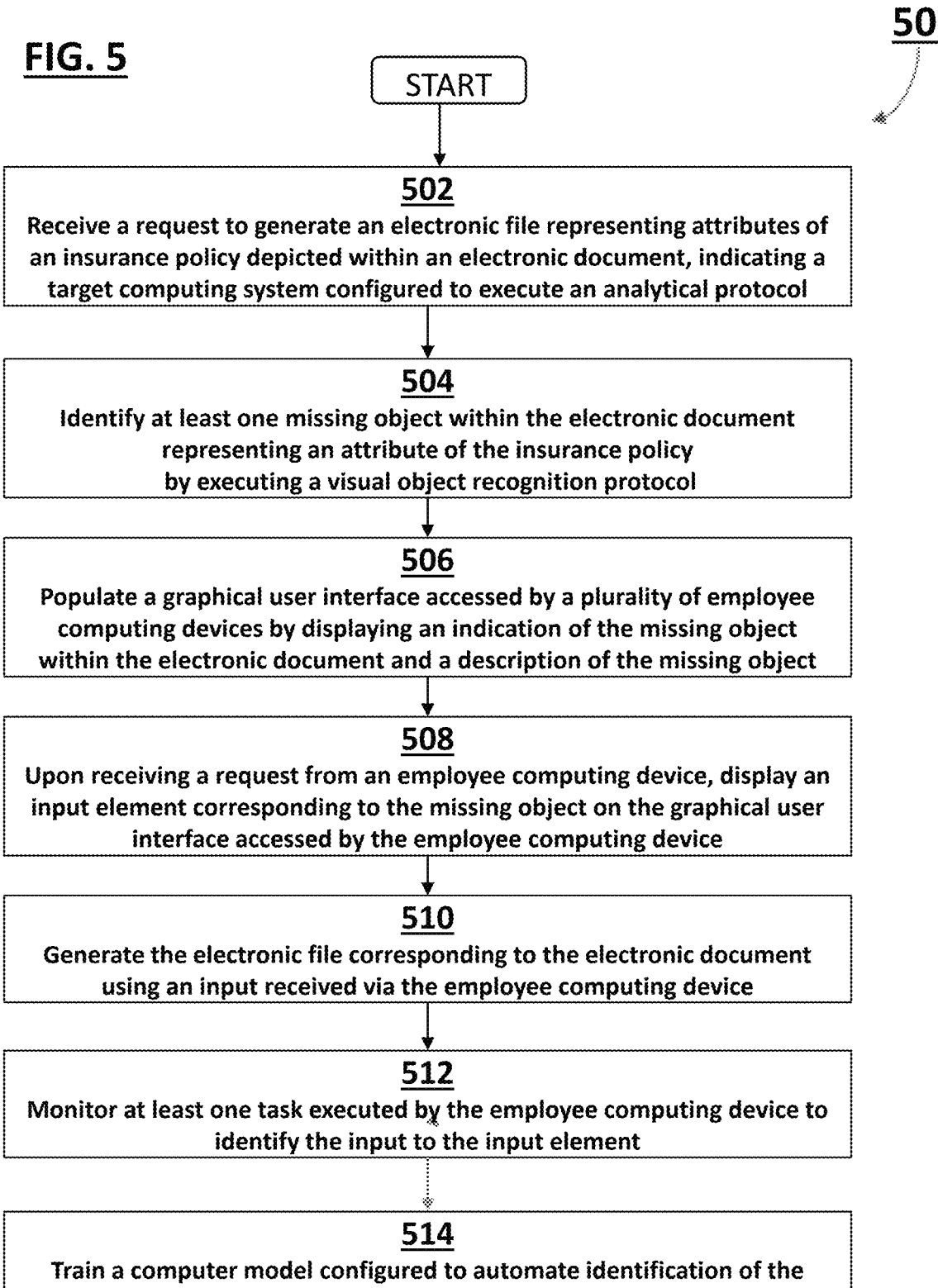

500

START

502
Receive a request to generate an electronic file representing attributes of an insurance policy depicted within an electronic document, indicating a target computing system configured to execute an analytical protocol

504
Identify at least one missing object within the electronic document representing an attribute of the insurance policy by executing a visual object recognition protocol

506
Populate a graphical user interface accessed by a plurality of employee computing devices by displaying an indication of the missing object within the electronic document and a description of the missing object

508
Upon receiving a request from an employee computing device, display an input element corresponding to the missing object on the graphical user interface accessed by the employee computing device

510
Generate the electronic file corresponding to the electronic document using an input received via the employee computing device

512
Monitor at least one task executed by the employee computing device to identify the input to the input element

514
Train a computer model configured to automate identification of the input received via the employee computing device, whereby the computer model ingests data associated with at least one task executed by the employee computing device to identify a second missing object similar to the at least one missing object within the electronic document.

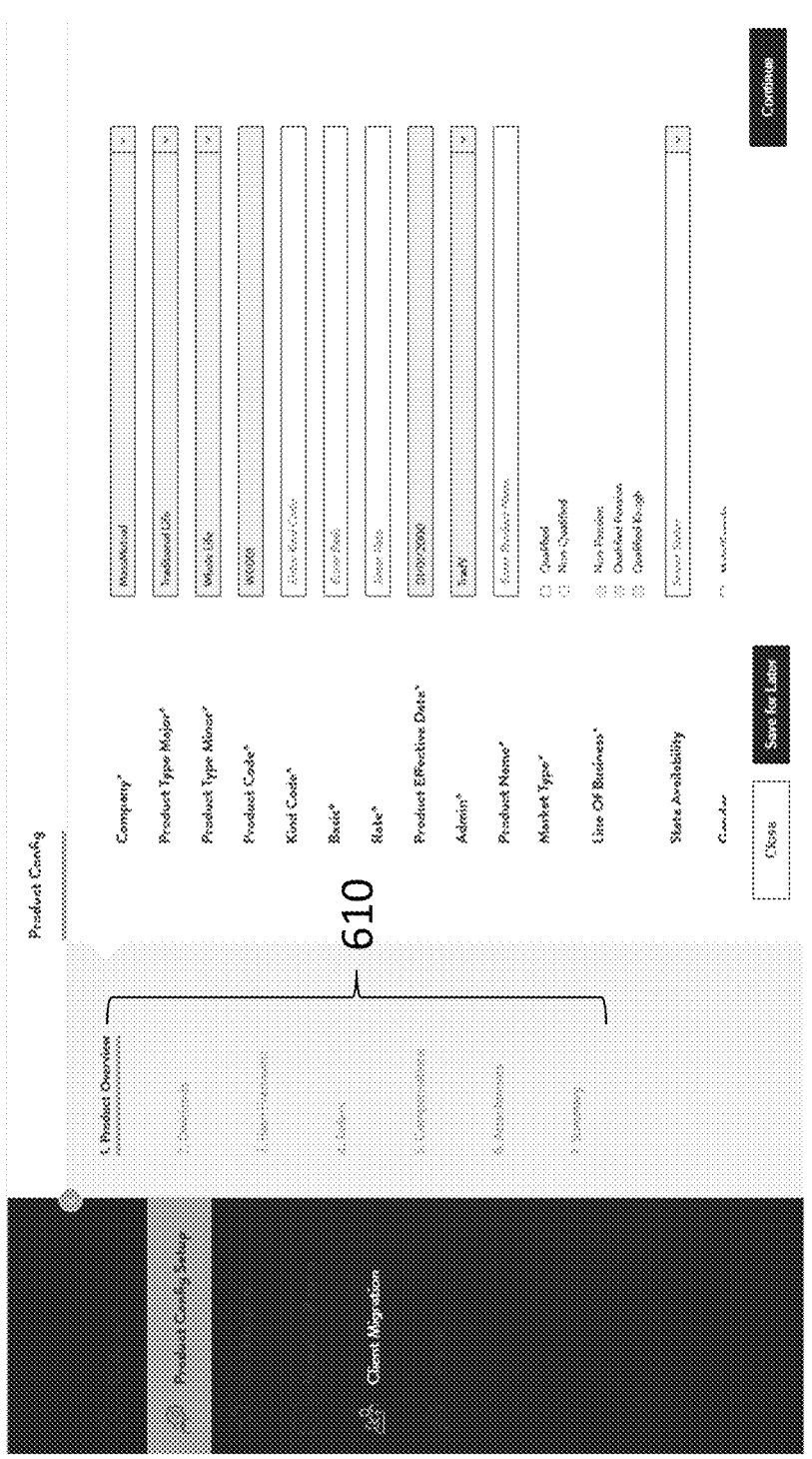
FIG. 6

710

700

SYSTEMS AND METHODS FOR DATA MIGRATION

CROSS-REFERENCE TO RELATED APPLICATIONS

The present application claims priority to U.S. Application No. 63/403,594, filed Sep. 2, 2022, which is incorporated herein by reference in its entirety for all purposes.

TECHNICAL FIELD

The present disclosure relates generally to systems and methods for data migration.

BACKGROUND

Data migration is typically a tedious activity for companies in all industries. In the life insurance industry there are particular challenges for achieving a successful data migration. These include factors such as the long term of insurance contracts, variety of insurance regulatory requirements throughout the decades, high number of products to be managed, many affected systems, and large external effect on policyholders. A basic requirement for a successful migration project is that the life insurance contracts and other involved insurance contracts should be transferred to the new system in a technically correct and consistent manner. The guarantees that were given to the policyholders must remain in place. An old system may be shut down after a complete migration of the insurance policy data. Project risk can be very high due to the many affected systems and the large external effect.

Conventional industry technologies used for transforming policies require custom data implementation to transform existing policies to meet the rules of target administrative systems. A given policy migration project typically requires development of custom software for one time use. Such custom development projects generally increase in complexity with complicated product rules, low data quality, and higher data variance to the target administrative systems.

Due to incomplete portfolio data in old systems and dependence on manual processes, data quality is often poor. Data migrations in the life insurance industry, also herein called policy migrations, can be problematic with technologically outdated policy management systems that can be, e.g., 20, 30, or 40 years old. There may be few remaining employees having the necessary technical detailed knowledge to maintain the systems. Organizations in the life insurance industry may have many old insurance policies that were never digitalized. As a result, the old insurance policies must be manually reviewed for verification of their attributes (e.g., beneficiary, terms, policyholders, payment amounts, and values) before they can be analyzed by computer automated methods.

Conventionally, a reviewer manually reviews a scan of an old insurance policy and uses a software tool to input various attributes and to generate an electronic file that represents the old insurance policy in the migration project. This manual review can be inefficient in identifying and correcting missing, illegible, or incorrect information. Review can be inconsistent depending on competency of given reviewers.

SUMMARY

What is desired are improved methods for migrating and digitizing old insurance policies and related administrative data in the life insurance industry. What is desired are tools for migrating insurance policies and related data that reduce reliance on a customized project for each policy migration. What is desired are improved methods for migrating documents that incorporate improved, more efficient methods of review for identifying and correcting missing, illegible, or incorrect information. Further, what is desired are improved methods for migrating documents that incorporate more dependable assignment of document review tasks.

Embodiments described herein aim to improve the efficiency of data migration of old insurance policy data. Computer automated methods and visual analytic tools can analyze electronic documents related to insurance policies to automatically identify attributes of the insurance policies. Document migration workflows incorporate computer automated techniques for monitoring historical performance of reviewers in document review tasks and for analyzing the information to improve efficiency of document review. Computer automated methods for migrating documents may apply this analysis in selective automation of document review tasks and in more dependable allocation of tasks. Disclosed embodiments include scalable, configurable policy migration platforms that permit users to migrate source data using the platform's user interface without depending on complex customized procedures.

Disclosed embodiments monitor performance of various reviewing tasks in identifying and correcting missing, illegible, or incorrect information during document migration, and input the performance data into a machine learning model to train the model for improved efficiency of document review. A machine learning model may be continually trained using performance data. The machine learning model may extract patterns of performance over time from a set of monitored performance data for ongoing improvements to document review workflow.

A machine learning model trained using monitored performance data may be applied to selectively automate review tasks. Model training may extract patterns from a body of performance data in how various missing values are identified and inputted. Model training may extract patterns from a body of performance data in how various incorrect values are identified and corrected. Based on these patterns, the platform may automate various tasks instead of transmitting them to reviewers.

A machine learning model trained using monitored performance data may be applied to optimize a queue of review tasks. Model training may group tasks based on their attributes and send them to a particular reviewer or a group of reviewers. For example, the platform may determine that a group of reviewers are better at identifying a type of missing value associated with policy terms.

Disclosed embodiments incorporate a platform for analysis of electronic files relating to an old insurance policy using computer protocols such as visual analytics tools to identify attributes of the insurance policy. A policy migration process may automate typically complex custom migrations in a methodical workflow employing a simplified metrics-driven process. Systems of the disclosure incorporate built-in personas that cater migration features to a specific set of migration execution team roles such as policy edit and quality assurance (QA).

Layers of a data migration and policy transformation workflow may include source policies layer, normalization layer, and target policies layer. In an embodiment, the normalization layer includes an extraction, transformation, and loading (ETL) engine. The ETL engine inputs configuration files that incorporate mapping rules for mapping source policies to normalized values within a data dictionary. A cloud-based policy migration model includes a UI for migration team members (personas), and back end components including the ETL engine. Improved cloud-based ETL process of the disclosure addresses various challenges: how to monitor data sources; how translate source data into a standard structure; how to enrich data and handle missing data; and how to identify business logic.

In one embodiment, a method may comprise receiving, by a processor, a request to generate an electronic file representing attributes of an insurance policy depicted within an electronic document, the request indicating a target computing system configured to execute an analytical protocol using the electronic file, identifying, by the processor, at least one missing object within the electronic document by executing a visual object recognition protocol upon the electronic document, the missing object representing an attribute of the insurance policy; populating, by the processor, a graphical user interface accessed by a plurality of employee computing devices by displaying an indication of the missing object within the electronic document and a description of the at least one missing object; upon receiving a request from an employee computing device within the plurality of employee computing devices, displaying, by the processor on the graphical user interface accessed by the employee computing device, an input element corresponding to the missing object; generating, by the processor, the electronic file corresponding to the electronic document using an input to the input element received via the employee computing device; monitoring, by the processor, at least one task executed by the employee computing device to identify the input to the input element; and training, by the processor, a computer model configured to automate identification of the input received via the employee computing device, whereby the computer model ingests data associated with at least one task executed by the employee computing device to identify a second missing object similar to the at least one missing object within the electronic document.

In another embodiment, a computer system may comprise a processor and at least one memory, the processor having instructions that when executed by the processor are configured to perform the operations of: receiving data from a source policy database by an extraction, transformation, and loading (ETL) layer via a plurality of data connectors to the ETL layer, wherein the data from the source policy database comprises data representative of insurance policy administrative systems of a source organization; receiving configuration information by the ETL layer, wherein the configuration information defines mapping logic for mapping attributes of insurance policies within electronic documents of the source policy database to a data dictionary of normalized attributes of insurance policy data and policy administrative data within the ETL layer; translating the data received from the source policy database into target staging data according to the mapping logic in the received configuration information by incorporating the received configuration information into the ETL layer between the data received from the source policy database and the target staging data; and generating data for export to the target policy database by processing the target staging data via the ETL layer and synchronizing at least a portion of the data received from the source policy database, wherein the data for export to the target policy database comprises data representative of insurance policy administrative systems of a target organization.

Other objects, features, and advantages of the present disclosure will become apparent with reference to the drawings and detailed description of the illustrative embodiments that follow.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 5 illustrates a flow chart of a method for generating an electronic file representing attributes of an insurance policy using input received via an employee computing device, according to an embodiment.

FIG. 6 illustrates a product configuration data entry screen, according to an embodiment.

DETAILED DESCRIPTION

Figure 1:
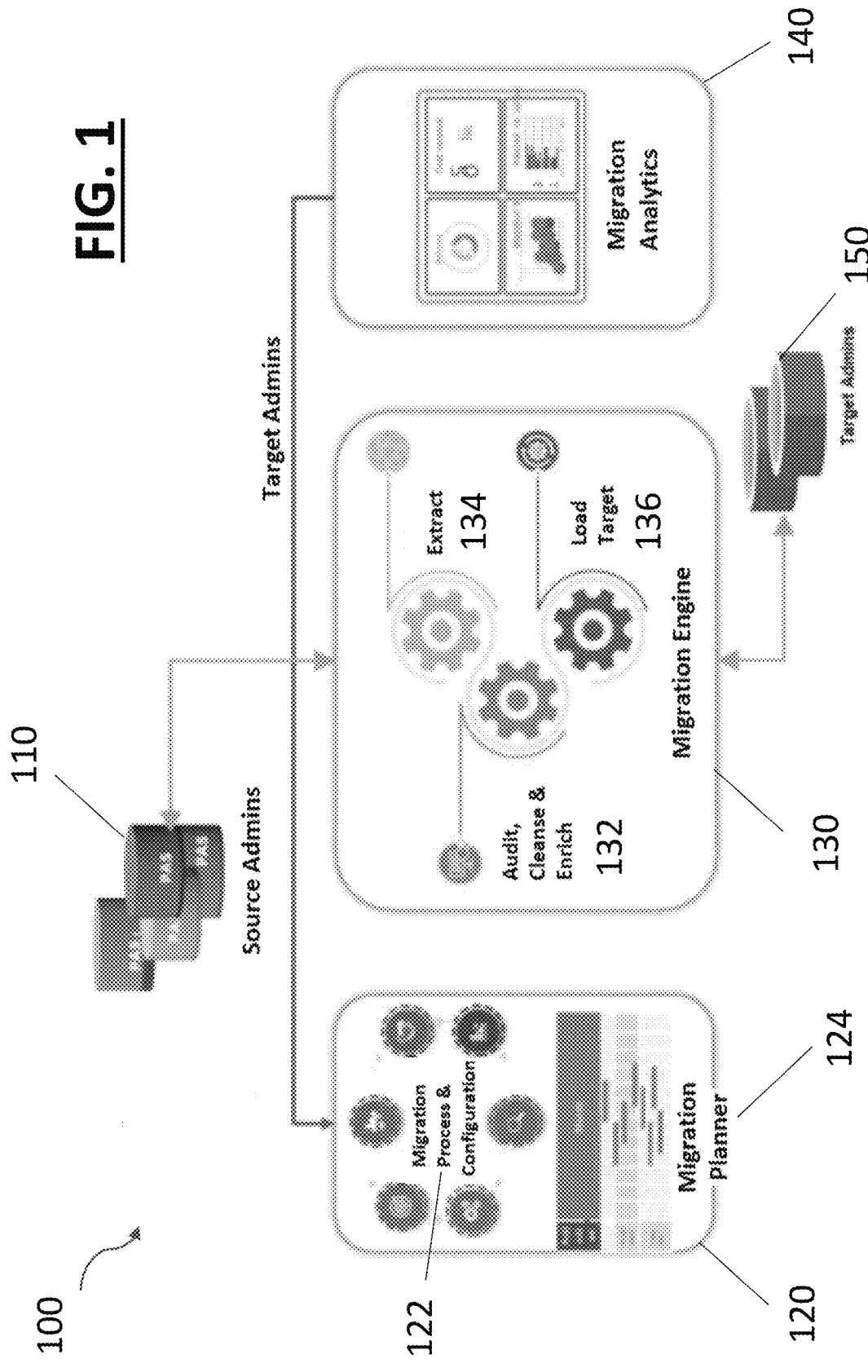
FIG. 1 illustrates a system architecture of a components of data transformation and policy migration platform, according to an embodiment.

In the following detailed description, reference is made to the accompanying drawings, which depict non-limiting, illustrative embodiments of the present disclosure. Other embodiments may be utilized and logical variations, e.g., structural and/or mechanical, may be implemented without departing from the scope of the present disclosure. To avoid unnecessary detail, certain information, items, or details known to those skilled in the art may be omitted from the following.

In conventional practices for document migration, reviewers may manually review a scanned version of a document and use a software tool to input various attributes of that document. The software tool then generates an electronic file that represents the document. This manual review can be inefficient in identifying and correcting missing, illegible, or incorrect information. Review can be inconsistent depending on competency of given reviewers.

In lieu of conventional manual review methods, disclosed embodiments may monitor performance of various reviewers in identifying and correcting missing, illegible, or incorrect information during document migration, and input the performance data into a machine learning model to train the model for improved efficiency of document review. A machine learning model may be continually trained using performance data. The machine learning model may extract patterns of performance over time from a set of monitored performance data for ongoing improvements to document review workflow.

In various embodiments, a platform may enable analysis of an electronic file relating to a document using various computer protocols to identify attributes of the document. In various embodiments, the document may be related to an insurance policy. Computer protocols may include visual analytics tools and artificial intelligence models such as natural language processing (NLP) techniques. The electronic document may be derived from a scanned version of a document using image conversion techniques, such as OCR. Typically in data migration of documents, some documents are missing values or include values that are not legible or are inappropriate. The platform automatically identifies the missing or inappropriate values and assigns them to a reviewer for further analysis. For instance, a reviewer will log onto a platform to view a queue of tasks to be accomplished. Each task may indicate what value is missing and may include the information needed for the reviewer to accomplish the identified task, such as a view of the scanned document for the reviewer to manually review and enter the missing attribute. After all the missing or inappropriate values of a particular insurance policy have been reviewed, and entered or verified by the reviewers, the platform can generate a file that is configured to be ingested by the downstream software. The file may be customized for the downstream software or may be a generic file that can be ingested by any software, e.g., vendor-neutral files.

In an embodiment, the electronic file may be related to an insurance policy and can include various types of data such as: (a) policy level data—face amount, coverages, conversion rights, rules and writers, how it was underwritten, issue age, etc.; (b) party level data—people associated with the contract such as insured; owner; premium payor, beneficiary; assignee; (c) transaction level data—history of transactions for the policy (e.g., payment activities, policy correspondence); and (d) agent level data—distribution structure for the contract such as advisor, firm sold through, originating producer, servicing producer.

Conventional document migration procedures generally involve a sequence of operations that can present a number of problems. At an initial step of retrieving source policy administration system data, old policy administration system data is likely to contain anomalies or data quality issues due to processing errors, exceptions, defects, or missing data. Extraction of business rules generally employs manually intensive procedures, e.g., in handling paper artifacts such as product specifications and policy contracts. Typical extraction operations are heavily dependent on subject matter expert knowledge. During transformation operations, mapping procedures and exception handling are often manual and time consuming. Conventional practice is to assess data quality on a post-conversion basis. In validating converted data, product and processing logic can be inconsistent, e.g., due to imprecise validation metrics and thresholds. Reconciliation may require costly, manual procedures. Unanticipated data or product capability gaps often emerge, e.g., due to migration complexity and lack of clarity in vendor system processing. At a final migration step, troubleshooting errors often requires going back through each step of the process. Troubleshooting can require continued reconciliation after migration.

In overcoming limitations of conventional document migration procedures, e.g., for insurance policy documents, systems and methods of the disclosure may employ a policy transformation technology that combines cloud computing technology with a fully configurable and decoupled architecture migration platform. These policy transformation technologies can encompass product specific business rules that can mutate based on vendor product evolution that may have occurred over decades. Scalable, configurable policy migration platforms of the disclosure can transform existing policies to meet a wide range of target admin system rules. The policy migration workflows of the disclosure can meet various challenges including large scale of policy migrations; complicated product rules; low source data quality; and high data variance to the target administrative system data.

Systems of the disclosure may incorporate built-in personas that cater migration features to a specific set of migration execution team roles with various levels of security. As used in the present disclosure, personas may be roles representative of a unique group of users, e.g., employees with various roles in policy migration workflow. Different personas may be required to access different features of the data transformation and policy migration platform. The user role access specified to each persona for the specific features needs to be mapped to the existing user roles defined within the data transformation (e.g., data entry user, policy edit QA user, administrative user). In an embodiment, personas expedite the policy migration workflow by prescribing smaller, more manageable tasks to be completed by distributed workers over the Internet, e.g., via crowdsourcing.

Table 1 shows an embodiment of user roles, features, and user access rights of a data transformation and policy migration platform.

TABLE 1

| Personas: User Roles, Features, User Access Rights | | |
|---|---|---|
| Personas | Features | User Access |
| Product Owner | Product Configurator | Read/Write |
| | Migration Planner | Read/Write |
| | Migration Simulation | Read/Write |
| | Client Migration Process | Read/Write |
| | Migration Analytics | Read only |
| Product Analyst | Product Configurator | Read only |
| | Migration Planner | Read only |
| | DQ Checks | Read/Write |
| | Policy Edit | Read/Write |
| | Policy View | Read/Write |
| | Migration Simulation | Read/Write |
| | Client Migration Process | Read/Write |
| | Migration Analytics | Read only |
| Policy Edit User | Policy Edit | Read/Write |
| | Policy View | Read/Write |
| | Migration Analytics | Read only |
| Policy Edit QA | Policy Edit | Read/Write |
| | Policy View | Read/Write |
| | Migration Analytics | Read only |
| Developer | Platform Configuration | Read/Write |
| | DQ Checks | Read/Write |
| | Migration Planner | Read only |
| | Migration Simulation | Read only |
| Business analyst | Migration Analytics (Due Diligence Process) | Read/Write |
| | DQ Checks | Read/Write |

In various embodiments, features associated with personas may include, among others (a) product configurator, which can define new product definitions and product specific features such as upload product specifications, rates documents. This tool can clone existing product while creating new products and making adjustments before publishing as needed. (b) migration planner, an iterative migration planning tool to identify the targeted group of policies based on selected parameters and criteria; (c) policy edit, which can perform data assertion and data enrichment along with the ability to clean non policy data; (d) policy view, which can search the policy migration model database and view any policy within the database in a view only mode based on a given search parameters such as policy number and/or customer name; and (e) DQ checks, which can assess and ensure data quality based on set rules to validate the source policies. DQ check employs a process to validate the existing policy data to the product definitions and correct at the source.

In an embodiment, the policy migration workflow may incorporate a machine learning model configured to map source policy data structure to target policy structure. In an embodiment, machine learning models are trained to determine attributes of business logic of legacy transactions (e.g., old insurance policies). In an embodiment, machine learning model generate and display policy migration user interfaces. In an embodiment, machine learning model may refer to methods such as logistic regression, decision trees, neural networks, linear models, and/or Bayesian models.

As seen in FIG. 1, data transformation and migration platform 100 incorporates various component systems:

Policy Administration System (PAS) source data 110, which may be compatible with PAS for life, annuity, disability insurance products. In the present disclosure, PAS data is sometimes called administrative system data.

Due diligence platform 120, which includes migration process and configuration tools 122, and Migration Planner 124.

Migration engine 130, which includes: audit cleanse & enrich module 132—systems for managing audit and cleansing of data; extract module 134—an iterative module for extracting content from PAS source data 110 and for executing a migration plan; and load target module 136—maps data to target VPN, loads data to a target administration system database 150, and verifies loaded data.

Migration analytics 140, which performs various types of migration analytics.

PAS target administrative system database 150.

In an embodiment data transformation and migration platform 100 is fully configurable. In an embodiment, components of data transformation and migration platform 100 are housed in a cloud environment, e.g., a third-party cloud.

In disclosed embodiments, stages or layers of data migration and policy transformation workflow include source administrative system data layer, normalization layer, and target administrative system data layer. Table 2 shows illustrative allocation of functions of these workflow layers.

TABLE 2

| Function | Source Admins | Normalization Layer | Target Admins |
|---|---|---|---|
| Product Definition | ● | ● | ● |
| Product Build | ● | | ● |
| Due Diligence | ● | ● | ● |
| Validation | | ● | |
| Policy Cleanup | ● | | ● |
| Policy Data Enrichment | ● | ● | ● |
| Data Assertion | | ● | |
| Policy Transformation | | ● | |
| Policy Migration | | ● | |
| Downstream Integration | ● | | ● |

Function Allocation of Data Migration and Policy Transformation Workflow

Most often PAS migrations require analysis and changes in both source and the target administration systems, in addition to data modeled in the normalization layer. Examples can include product definition. The normalization layer facilitates the analysis in source and target administrative system data. The workflow focuses on various aspects of the migration to identify changes needed in source administrative system, book of record, and target administrative systems.

The normalization layer is a primary technology for policy migration, and effects various related functions. The normalization layer validates various aspects of the policy migration. The normalization layer performs data quality checks. The normalization layer may perform data quality checks via data assertion, queries that look for problems in the migration dataset. The normalization layer executes policy transformation both in data imported from source administrative system data and data exported to target administrative system data.

In various embodiments, the normalization layer includes an extraction, transformation, and loading (ETL) engine that is engineered to simplify traditional ETL technologies. The ETL engine of the disclosure may be adapted to a wide range of data volumes and data formats such as ASCII, JSON, industry standard database technologies, and mainframe EPSIDIC data formats. The ETL engine differs from conventional ETL technologies that require custom development and custom code for every implementation. The improved cloud-based ETL process of the disclosure addresses various challenges: how to monitor data sources; how translate source data into a standard structure; how to enrich data and handle missing data; and how to identify business logic. In contrast to conventional ETL processes that rely on back-end coding, improved ETL processes of the disclosure permit expert users such as product analysts and business analysts to migrate source data using the platform's user interface, with no back end coding change needed.

In conventional policy migration practice, every migration project for a new source system requires definition of mapping specifications for that source system. In contrast, the policy migration workflow of the disclosure defines a standardized mapping model. In an embodiment, the ETL engine incorporates a data dictionary incorporating data fields with normalized field names and field values. In an embodiment, the normalized data fields in the data dictionary incorporate vendor-neutral data types in the life insurance industry encompassing a range of insurance products, e.g., life insurance, annuity, and disability insurance products. In disclosed embodiments, the ETL engine employs mapping rules that are configurable through easy-to-use configuration packs. These configuration packs can be readily modified to support various source policy administrative system data and target administrative system data.

A migration process workflow of the disclosure automates typically complex custom policy migrations to provide a methodical workflow employing a simplified metrics driven process. Table 3 shows stages of an end-to-end policy migration management workflow.

TABLE 3

Stages of Policy Migration Management Workflow

| Due Diligence | Normaliza-tion | Data Enrichment | Simula-tion | Migra-tion | Performance Analytics |
|---|---|---|---|---|---|

The due diligence stage performs product-based preliminary analytics. In an embodiment, features and tools of due diligence include: product configurator, a tool to define product definitions and product specific features; migration planner, an iterative migration planning tool for targeted groups of policies; and block analytics, which provides pre-analytics for successful migration planning.

The product configurator defines new product definitions and product specific features such as product specifications. It can clone an existing product while creating new products and making adjustments before publishing as needed.

In disclosed embodiments, a due diligence platform 120 incorporates a product configuration wizard within process migration & configuration tools 122. The product configuration wizard may allow a range of life, annuity, and di products to be defined with industry standard product structure. This tool may be used for loading and refreshing the source policies into the policy migration system and for identifying policy data quality, dependency analysis and migration planning.

A migration planner 124 may allow iterative migrations to be scoped, redefined, and scheduled. In an embodiment, this tool controls execution of migration based on Simulation results. In disclosed embodiments, a migration iteration focuses on specific set of policies that are identified through integrated due diligence process. Due diligence provides deep insights on various levels of PAS data analysis including complexities, data quality issues, out of compliance policies, broken policies, and policies that are supported on manual workarounds. These insights form a foundation for the migration workflow and are employed to plan a successful migration iteration.

In an embodiment, systematic due diligence starts with a deep block analysis that reverse engineers source administrative system data policies 110 to identify a successful path for migrating policies into target administrative system database 150. This analysis compares source product features to the target admin capabilities and source policy data qualities. Iterative analysis of product variations may proceed from less complexity to higher complexity. As product complexity increases, the due diligence process identifies various transformation rule sets, data enrichment and assertion processes to normalize the policies for a successful migration.

The normalization stage executes normalization of policy data and supplemental data into standardized data sets. In an embodiment, features and tools of normalization 120 include configuration pack, a predefined configuration pack for the defined insurance product range. In an embodiment, the predefined configuration pack encompasses life, disability, and annuity insurance policies.

In disclosed embodiments, the migration platform is equipped with base normalization data structure that support a generalized life, annuity, and disability insurance products. This data structure allows the normalization platform to be loaded with any of these types of policies instantly. This feature allows the normalization platform (e.g., migration engine 130) to export the same policy data sets to multiple to systems as necessary. Base normalized data structure can be easily extended for unique products.

In an embodiment, normalization platform incorporates data transformation technology is configured to normalize source policies 110 without requiring additional code build. This data transformation allows the policies to be enriched for higher data quality. In addition, the policy migration workflow allows policy migrations to be simulated prior to actual migrations to assess the success rate of the migration. The workflow embeds policy migration best practices and simplifies the migration.

The data enrichment stage performs data quality checks and data assertions, and data alignment with target administrative system data. In an embodiment, features and tools of data enrichment include: (a) data quality engine, an engine to assess and assure DQ and to validate source policies 110; and (b) policy edit, data assertion and data enrichment capabilities effected prior to migration of the policies.

In disclosed embodiments, the migration process workflow incorporates data enrichment processes that allow policy data objects to be edited, corrected, and enriched. The policy edit process allows the policies to be enriched and asserted with supplemental data to make the policy whole and meet the target admin requirement. Various processes for enriching data objects depend on the type of data elements that need to be updated. In an example, data enrichment stage routes all contractual information in need of correction to be updated at the book of record systems in order to ensure data integrity of the policies. Data enrichment includes features (e.g., user interfaces) to edit and update policies in cases in which data needs to be asserted for accuracy using information not captured in the source policy administrative system data. In an example, data assertion supplies beneficiary name and beneficiary details not included in source administrative system data. Data enrichment also may provide options to include default data elements as additional data needed by the target administrative system data, in cases in which the data elements do not change state and contractual details of the policy data objects.

These data enrichment capabilities can enable target policy data to be more precise than the source system, increasing data quality in the target systems.

The Simulation stage performs dry run migration of a policy iteration population. In an embodiment, Simulation includes policy migration simulation capabilities to assess migration outcomes prior to migration. The simulation process validates the success of targeted population of policy migration. Simulation provides a mechanism to improve policy migration success rate based on defined performance metrics. For example, simulation may be employed to plan migration for complex products and for source policies with low data qualities.

In disclosed embodiments, this simulation process may be iterative, and may be repeated to identify the policies that will be successfully loaded in the target admin and show the preview of the impacts to the existing downstream systems. A built-in equivalency process and a policy hold feature automates simulation with a feedback loop to automatically incorporate migration fallouts and their reasons.

The migration stage effects migration of policies to the target administrative system database 150 and its subsystems. In disclosed embodiments, the migration workflow executes the migration stage once expected results from simulation have achieved an acceptable level of performance for certain group of policies. The migration workflow may incorporate a refresh process that loads source administrative system data to refresh the target administrative system data, e.g., on a continuous or periodic basis. In an example, this refresh process ensures policies updates at the book of record system are brought to the target administrative system data with integrity until final migration.

The performance analytics stage performs automated equivalency and post-migration analytics. In an embodiment, features and tools of performance analytics include: (a) migration—client migration that migrates policies and client information to the target administrative system database 150; and (b) equivalency—a systemized equivalency process to measure and validate the migration outcome. In an embodiment, a migration analytics dashboard provides views of pre-migration and post-migration statuses of targeted policies.

In disclosed embodiments, the migration workflow incorporates data quality check (also called "DQ check" herein) as an independent process that can be invoked at various point of the workflow. DQ check tracks data quality of the imported policies. The migration management process invokes DQ check as necessary, including just before export. In various embodiments, DQ check can be invoked to check target administrative system data product definition rules, data validation rules, and data assertions. In an example, data assertions check both policy level and supplemental data such as beneficiary, agent data that are identified through the specific set of DQ check schemes.

In an embodiment, the DQ check process incorporates various features:

DQ check process is invoked as necessary;

Centralizes automation of export data validations;

Defines requirements for DQ check process in tracking data quality of the imported policies;

Provides metrics of policy audit statuses.

Figure 2:
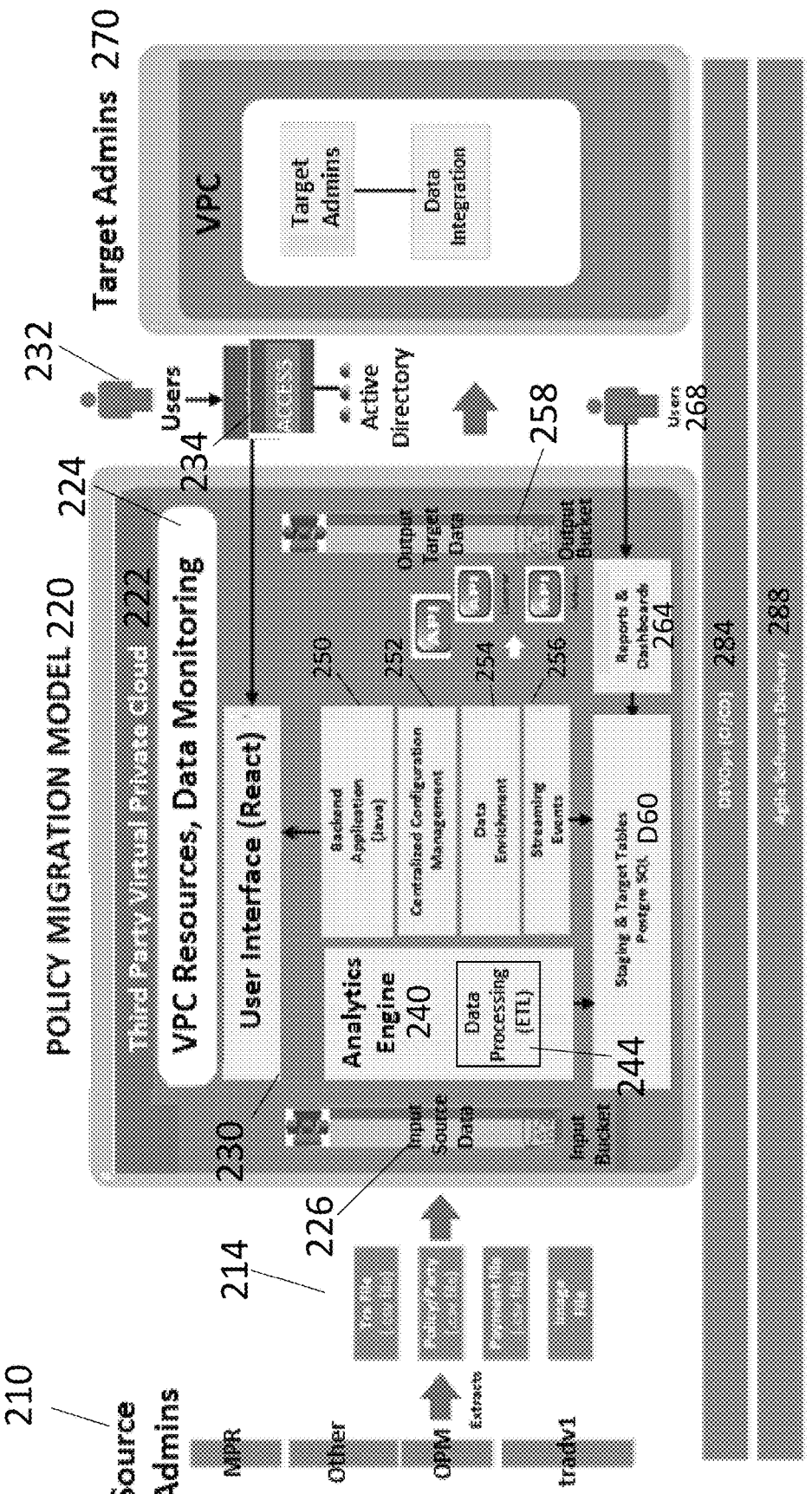
FIG. 2 illustrates an architecture of a high-level policy migration model, according to an embodiment.

FIG. 2 illustrates an architecture of a high-level policy migration model 200. Major components of the policy migration model include source administrative system data 200, Policy migration model 220, and target administrative system data 270. Source administrative system data may include various source policy administrative system data associated with various administrative and ancillary policy systems such as MPR, OPM, and tradv1. The migration model extracts various policy files 214 from the source administrative system data such as Trx files, policy/party files, payment files, and image files. These policy data are uploaded to Policy migration model 220 and loaded for VPC storage at input bucket 226.

In an embodiment, policy migration model 220 (PMM 220) is housed in a third party virtual private cloud (VPC) 222. VPC monitoring 224 monitors resources and data within VPC 222. Policy migration model 220 includes front end and back end components. Front end of PWM 220 includes user interface 230, which receives inputs from users 232 via access control 234. In an embodiment, access control 234 employs an active directory that associates different users with respective personas, user roles required to access different features of the data transformation and policy migration platform, and with different levels of access privileges for these user roles. In an embodiment, User Interface 230 incorporates components from the opensource ReactJS JavaScript library for building user interfaces.

Back end components of PMM 220 manage instances in the cloud. These components include analytics engine 240. In an embodiment, analytics engine 240 embodies a unified engine for large-scale data processing. In an embodiment, analytical engine 240 can be executed by a server, one or more server computers, authorized client computing devices, smartphones, desktop computers, laptop computers, tablet computers, PDAs, and other types of processor-controlled devices that receive, process, and/or transmit digital data. Analytical engine 230 can be implemented using a single-processor system including one processor, or a multi-processor system including any number of suitable processors that may be employed to provide for parallel and/or sequential execution of one or more portions of the techniques described herein. Analytical engine 230 performs these operations as a result of central processing unit executing software instructions contained within a computer-readable medium, such as within memory. As used herein, a module may represent functionality (or at least a part of the functionality) performed by a server and/or a processor. For instance, different modules may represent different portion of the code executed by the analytical engine server 230 to achieve the results described herein. Therefore, a single server may perform the functionality described as being performed by separate modules.

In an embodiment, analytics engine 240 includes a core that provides distributed task dispatching, scheduling, and basic I/O functionalities accessible through an application programming interface, and a database management component on top of the core for managing structured and semi-structured data. In an embodiment, analytics engine 240 is capable of performing batch processing of static data, and streaming computation of event stream data. Streaming computation enables high-throughput, fault-tolerant stream processing of live data streams.

In an embodiment, analytics engine 240 executes an Extract Transform Load (ETL) engine 244, also herein called ETL layer. ETL layer 244 serves as fundamental logic of analytics engine 240. ETL layer 244 deploys an ETL process that extracts, transforms, and loads data input to analytics engine 240 from multiple sources to a unified data repository, staging and target tables 160. The ETL process cleanses and organizes data based upon business rules for policy migration.

Additional back end components of PMM 220 include backend application 250 (e.g., JAVA API). Centralized configuration management 252 handles configuration data received from user interface 230, for input to analytics engine 240. Configuration data allows a range of life, annuity, and disability insurance products to be defined with industry standard product structure, e.g., generated via user inputs using product configuration wizard 122. Data enrichment module 254 handles policy data enrichment data, e.g., data assertions received from data quality engine or data received from user interface 232 such as data quality checks and policy edit data. Streaming event module 256 generates streaming event data for streaming computation by analytics engine 240. Analytics engine 240 may runs streaming event data from incrementally and continuously, updating the final result as streaming data continues to arrive.

Target tables 260 provide a data repository for data output by ETL layer 244. Target tables 260 are sometimes called staging data or staging tables herein because they are used for processing target policy data output by the ETL layer before loading the data into the target database, target administrative system 270. Target tables 260 may store staging data during validation procedures. Target tables 260 may store staging data during policy migration simulation procedures to assess migration outcomes prior to migration.

Databases 226, 258, 260 are organized collections of data, stored in non-transitory machine-readable storage. The databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating, and/or administration of databases. The databases may conform to a well-known structural representational model, such as relational databases, object-oriented databases, or network databases. Example database management systems include MySQL, PostgreSQL, SQLite, Microsoft SQL Server, Microsoft Access, Oracle, SAP, dBASE, FoxPro, IBM DB2, LibreOffice Base, and FileMaker Pro. Example database management systems also include NoSQL databases, i.e., non-relational or distributed databases that encompass various categories: key-value stores, document databases, wide-column databases, and graph databases.

Reports and dashboards module 264 may generate various reports and dashboards of target policy data for display to users 268. In an embodiment, data transformation and policy migration platform incorporates IT capabilities. DevOps (CI/CD) 284 facilitates development of IT applications on multi-cloud environments with continuous integration/continuous delivery to facilitate testing and deployment. Agile software delivery 288 applies Agile practices to software development.

Once target policy data has satisfied applicable validation and simulation procedures, PMM 220 pulls data from VPC storage at output bucket 258 to load this data to the target platform, target administrative system 270. In addition to integration of policy migration data exported by PMM 220, target administrative system 270 may execute policy data management functions such as product definition, product build, due diligence, policy cleanup and policy data enrichment.

Figure 3:
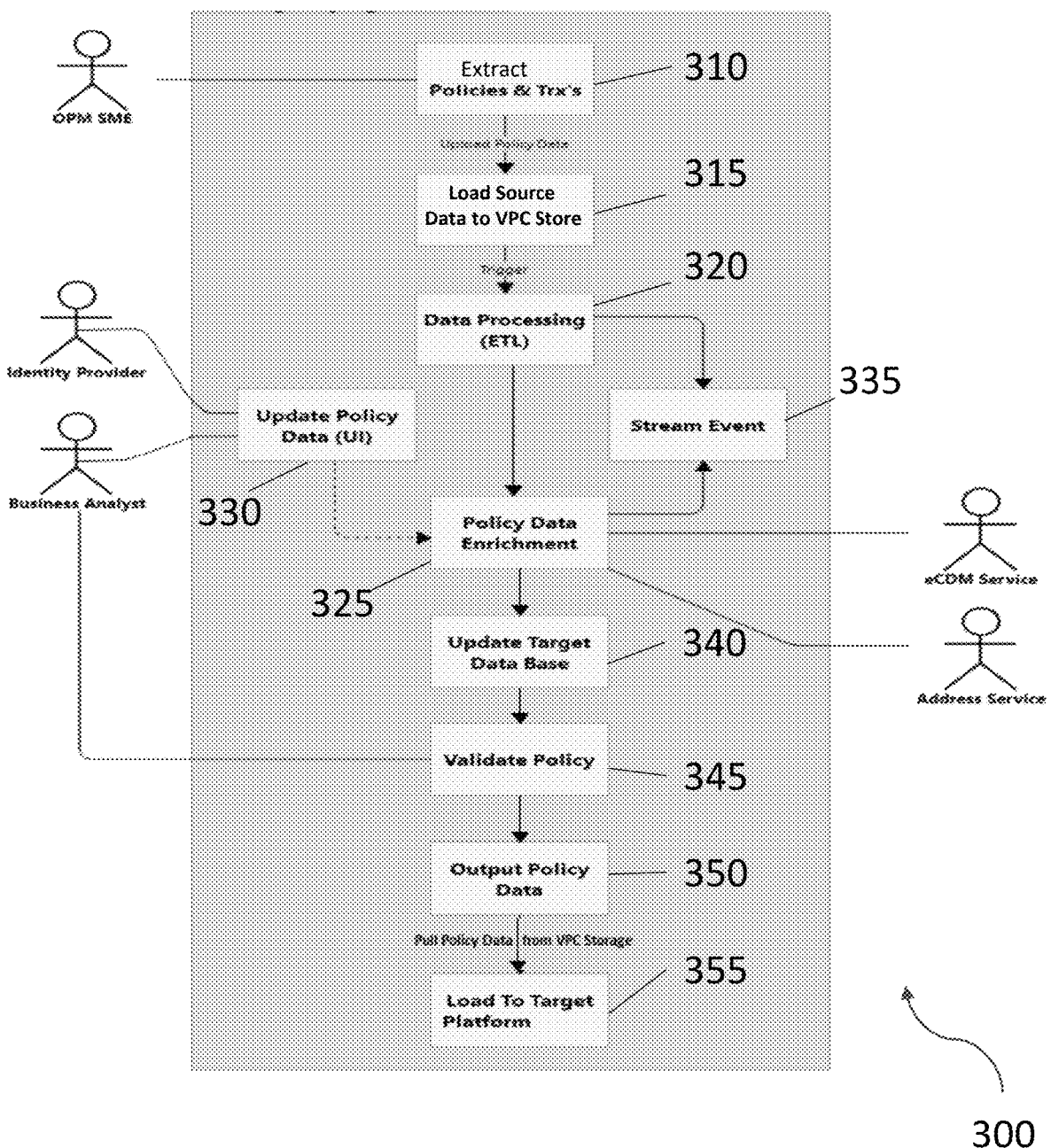
FIG. 3 illustrates a flow chart of workflow for policy data migration, according to an embodiment.

FIG. 3 shows a flow chart of policy data migration workflow 300. In an illustrative embodiment, the workflow 300 is implemented using the policy migration model 200. At step 310, the workflow extracts policy source data 214, e.g., policies & Trx files, from source administrative system data 210. At step 315, the workflow uploads the extracted source data to cloud storage (e.g., VPP storage 226 within PMM 220). Step 320 triggers ETL data processing of the source policy data, e.g., via ETL Layer 244. ETL data processing 320 may include stream computation of Stream Events data generated at step 335. ETL data processing includes policy data enrichment 325, such as user-inputted updated policy data from step 330. For example, steps 325, 330 may be implemented via data flow from UI 230 to data enrichment module 254.

Step 340 updates the target database (e.g., staging target data 260) with target policy data generated at steps 320, 325. Step 345 validates the staging target data. In an embodiment, step 345 carries out iterative Simulation migrations as part of the validation process. Step 350 triggers output of the target policy data, e.g., export from VPC output storage 258. Step 355 loads the validated target policy data to the target platform, e.g., target administrative system 270.

Figure 4:
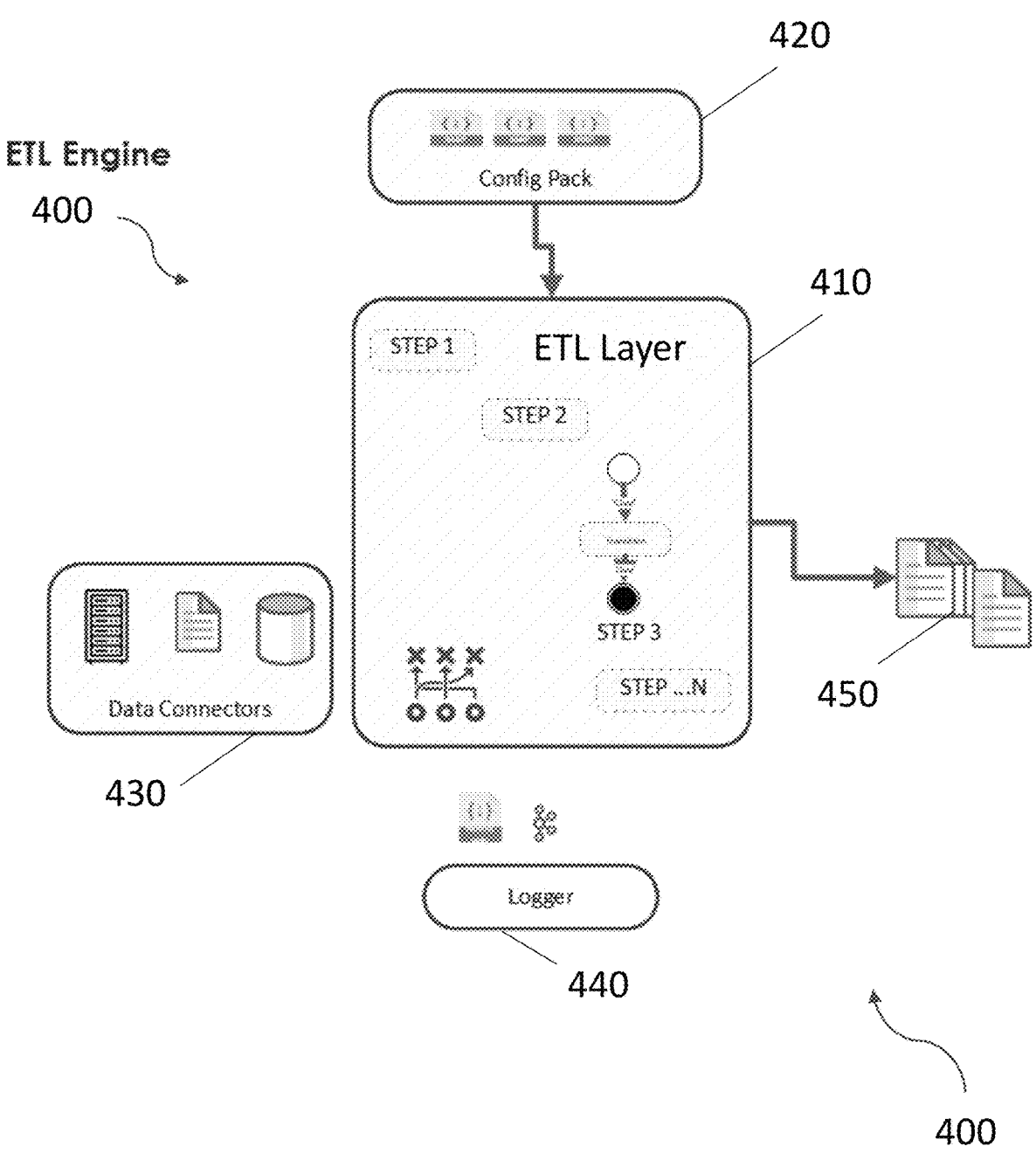
FIG. 4 illustrates a system architecture of an extraction, transformation, and loading (ETL) data transformation engine, according to an embodiment.

FIG. 4 illustrates a system architecture of an extraction, transformation, and loading data transformation engine (ETL engine) 400. ETL engine 400 includes an ETL Layer 410 that receives inputs 420, 430 and that outputs target policy data 450. Logger 440 records a log file of events within the ETL Engine 400, which can provide insights concerning the ETL process. The ETL engine incorporates a data dictionary including data fields with normalized field names and field values. In an embodiment, the normalized data fields in the data dictionary incorporate vendor-neutral data types in the life insurance industry encompassing a range of insurance products, e.g., life insurance, annuity, and disability insurance products. In disclosed embodiments, the ETL engine employs mapping rules that are configurable via configuration packs 420.

In an embodiment, data connectors 430 input source policy data received from a source policy database representative of insurance policy administrative systems of a source organization. In an embodiment, data connectors 430 enable a database management component of ETL Engine 400 to act as the input data source for ETL Layer 410. Data connectors 430 support data pipelines for accessing/receiving various subsets of source policy data 214 for ETL extraction and loading. In an embodiment, ETL data transformation may transform data structure of a first number of source policy administrative systems 214, e.g., seven source policy administrative systems, to a second number of target policy administrative systems 270, e.g., four target policy administrative systems.

Config Pack 420 inputs configuration information to ETL layer 410 used in transforming the source policy data received from data connectors 430 into target output data 450. In an embodiment, configuration data in config pack 420 includes mapping logic that guides the ETL layer 410 in this data transformation. Config pack 420 contains mapping files that map source data to a data dictionary. The data dictionary serves as a centralized metadata repository of information about data of the insurance domain including meaning, relationships to other data, usage, and format. In various embodiments, the mapping files contain mapping logic for insurance policies within electronic documents of a source policy database and target policy database representing inputs and outputs of the ETL layer 410. In an embodiment, the source policy database is representative of insurance policy administrative systems of a source organization (e.g., source administrative system data 210), and the target policy database is representative of insurance policy administrative systems of a target organization (e.g., target administrative system 270).

The following example illustrates mapping logic embodied in mapping files within config pack 420. In an embodiment, a mapping file has a series of rules that indicate, for a given field, if the source system has a particular field value then the normalized field is assigned the value indicated in the mapping. The pseudocode below shows mapping logic that maps field values of a normalized field name ("outputfield": "Dividend Option"). This field has different values in the source policy database ("pattern"). The mapping logic maps these source values to normalized values in the ETL data dictionary ("value"). For example, if the field has a field value in the source database of "0", the mapping logic maps this field value to normalized value "Cash."

```
"outputfield": "Dividend Option",
"patterns": [
    "value": "Cash",
    "pattern": "[O_DIV_OPT_CD]—'0'
    "value": "PRCash"
    "pattern": "[O_DIV_OPT_CD]—'1'
    "value": "Terains"
    "pattern": "[O_DIV_OPT_CD]—'2'
    "value": "PaidUp"
    "pattern": "[O_DIV_OPT_CD]—'3'
```

ETL engine 400 incorporates the configuration information into the ETL layer 410 between the received data 430 from the source policy database and target policy data 450. In an embodiment, ETL engine 400 operates iteratively to generate a series of policy iteration populations (Step 1, Step 2, Step 3, . . . Step N).

In an embodiment, target policy data 450 is target staging data. In an embodiment, the policy migration model is configured to generate data for export to the target policy database by processing the target staging data via the ETL layer and synchronizing at least a portion of the data received from the source policy database. The policy migration model may be configured to generate one or more iterations of simulation data exports to the target policy database and to assess a success criterion of each simulation data export prior to the final policy migration to the target policy database.

FIG. 5 shows execution steps of a processor-based method 500 for generating an electronic file representing attributes of an insurance policy using input received via an employee computing device. The illustrative method 500 comprises execution steps 502, 504, 506, 508, 510, 512, and 514. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In various embodiments, the method 500 monitors performance of various reviewers in identifying and correcting missing, illegible, or incorrect information during document migration, and inputs the performance data into a machine learning model to train the model for improved efficiency of document review. The machine learning model may be continually trained using performance data. The machine learning model may extract patterns of performance over time from a set of monitored performance data for ongoing improvements to document review workflow.

Upon receiving a request, the method 500 generates an electronic file representing attributes of an insurance policy depicted within an electronic document using an input received via an employee computing device. The request indicates a target computing system configured to execute an analytical protocol using the electronic file. The method trains a computer model configured to automate identification of the input received via the employee computing device.

At step 502, a processor receives a request to generate an electronic file representing attributes of an insurance policy depicted within an electronic document. The request indicates a target computing system configured to execute an analytical protocol. In an embodiment, the request is received at a platform that enables analysis of the electronic file relating to an old insurance policy.

In an embodiment, the request to generate an electronic file seeks to analyze an electronic file relating to an old insurance policy using computer protocols to identify the attributes represented by the electronic file. In an embodiment, the request may initiate transformation of source policy data associated with the one or more old insurance policies to generate target policy data, and migration of the target policy data to the target data computing system. In an embodiment, the processor may be associated with a data transformation and policy migration platform.

At step 504, the processor identifies at least one missing object within the electronic document representing an attribute of the insurance policy by executing a visual object recognition protocol. In various embodiments, the visual object recognition protocol may apply artificial intelligence models, such as natural language processing (NLP) models. In various embodiments, the electronic document may either be missing one or more values or may include values that are not legible or that are inappropriate. The platform automatically identifies those missing or inappropriate values and assigns them to a reviewer for further analysis.

In an embodiment, the at least one missing object may include information that is mandatory in business rules associated with the electronic document. In an embodiment, the at least one missing object may comprise information that is illegible. In an embodiment, the electronic document may contain information that is inappropriate, e.g., in business rules associated with the electronic document.

At step 506, the processor populates a graphical user interface accessed by a plurality of employee computing devices by displaying an indication of the missing object within the electronic document and a description of the missing object. In an embodiment, the plurality of employee devices may be associated with personas. As used in the present disclosure, a persona is a role representative of a unique group of users, e.g., employees who may share common goals and behaviors. In the embodiment of step 502 in which the request is associated with transformation of source policy data and migration of target policy data to the target data computing system, different personas may be required to access different features of a data transformation and policy migration platform.

In embodiments of step 506, in iterative performance of the method 500 the plurality of employee computing devices may be associated with a particular reviewer or a group of reviewers who are allocated one or more document review tasks at model training step 514. Model training may group tasks based on their attributes and send them to these employee computing devices. For example, the processor may determine that a group of reviewers are better at identifying a type of missing value associated with policy terms.

In embodiments of step 506, a graphical user interface in communication with the processor may present various visual tools to employee computing devices. these visual tools may include, among others, policy edit, which can perform data assertion and data enrichment along with the ability to clean non policy data; policy view, which can search a policy migration model database and view any policy within the database in a view only mode based on a given search parameters such as policy number and/or customer name; and DQ checks, which can assess and ensure Data Quality based on set rules to validate the source policies. DQ check employs a process to validate the existing policy data to the product definitions and correct at the source. See Table 1 and FIGS. 7 and 8.

At step 508, upon receiving a request from an employee computing device, the processor displays an input element corresponding to the missing object on the graphical user interface accessed by the employee computing device. The input element may correspond to one or more values of the missing object, or may represent an acceptance or rejection of value(s) of the missing object previously proposed by another reviewer. In various embodiments, the input element may comprise structured data or unstructured data. The input element may comprise a wide variety of data types, including, e.g., text or graphical data, as well as associated metadata.

At step 510, the processor generates the electronic file corresponding to the electronic document using an input received via the employee computing device.

At step 512, the processor monitors at least one task executed by the employee computing device to identify the input to the input element. In an embodiment of step 512, monitoring at least one task includes monitoring received input(s) as well as monitoring metadata including time stamps, persona data (user roles, features), comments, and other metadata associated with the received input or the employee computing device. See Table 1 and FIGS. 7, 8 for examples of steps 508, 510, and 512.

At step 514, the processor trains a computer model configured to automate identification of the input received via the employee computing device in step 512. At this step the computer model ingests data associated with at least one task executed by the employee computing device to identify a second missing object similar to the at least one missing object within the electronic document.

In an embodiment, the processor trains the computer model to monitor performance of different reviewers and to optimize a queue of tasks accordingly. Model training may group tasks based on their attributes and send them to a particular reviewer or a group of reviewers.

In an example, the platform may determine that a group of reviewers are better at identifying a type of missing value associated with policy terms. As a result, when a subsequent insurance policy is missing a policy term, the platform assigns manual review of the policy term to the identified group. In an example, the platform may determine that a group of reviewers are better at identifying and correcting an inappropriate value associated with policy terms. As a result, when a subsequent insurance policy includes apparently inappropriate policy term such as a term that violates a business rule, the platform assigns manual review of the policy term to the identified group. In an example, the platform may apply time series analysis to time stamp metadata associated with at least one task executed by the employee computing device to measure efficiency of task execution. Model training may send certain tasks to a particular reviewer or a group of reviewers based on efficiency metrics.

In an embodiment of step 514, the processor trains the computer model to monitor performance of reviewers in order to selectively automate review tasks. Model training may extract patterns from a body of performance data in how various missing values are identified and inputted. Model training may extract patterns from a body of performance data in how various incorrect values are identified and corrected. Based on these patterns, the platform may automate various tasks instead of transmitting them to reviewers.

In an example, the platform determines that all insurance policies from 1974 that were attributed to a particular agent are missing payment information. The platform also determines that all those missing payment information have been identified in an addendum of the insurance policy. Upon receiving an electronic document representing another insurance policy from 1974 attributed to the particular agent that is missing its payment information, the platform may automatically apply NLP techniques to the addendum to identify the missing policy term.

FIG. 6 illustrates a product configuration data entry screen 600. In an embodiment, a user such as a product analyst accesses data screen 600 to set up different features of a new product or to update features of an existing product. Data screen 600 may be used to set up a wide range of features such as product name, market type, line of business, states in which the product is available for sale, issue age ranges, etc. In an embodiment, the product configuration screen serves as a front end for a product configuration wizard that allows a supported product range to be defined with industry standard product structure. In an embodiment, the product configuration wizard supports a range of life insurance, annuity, and disability insurance products. The product configuration wizard may be used for loading and refreshing source policies into the policy migration system, among other uses.

In an embodiment, a user can select a product item from a grid of available products (not shown) and can select any action that is available based on the user's role and the product's status. The user can choose select "Create New Product" to create new product definitions. During setup of a new product, the user can select "Configure your Product" to display the product configuration data entry screen 600 of FIG. 6. At that screen, the user can enter the relevant information for product configuration.

All the data required to create a product is grouped under different sections depending on the product and will be listed on the left side at 610: product overview, dividends, base premiums, riders, compensations, attachments and summary. In an embodiment, product configuration data includes certain mandatory entries, and any such entry will be highlighted if the user attempts to submit product configuration data without filling in the entry.

During due diligence, the product configuration tool may be used to define new product definitions and product specific features such as product specifications. Product configuration set-up can clone an existing product while creating new products. After product configuration set-up and normalization, the Product Configuration tool may be used for additional functions such as identifying policy data quality, dependency analysis and migration planning. Migration planning can group policies based on different features within the policy data. At this stage, upon selecting a given feature at the product configuration screen 600, the UI may display a dropdown menu populated with values entered during product configuration set-up and with normalization data loaded into the policy migration model database.

Figure 7:
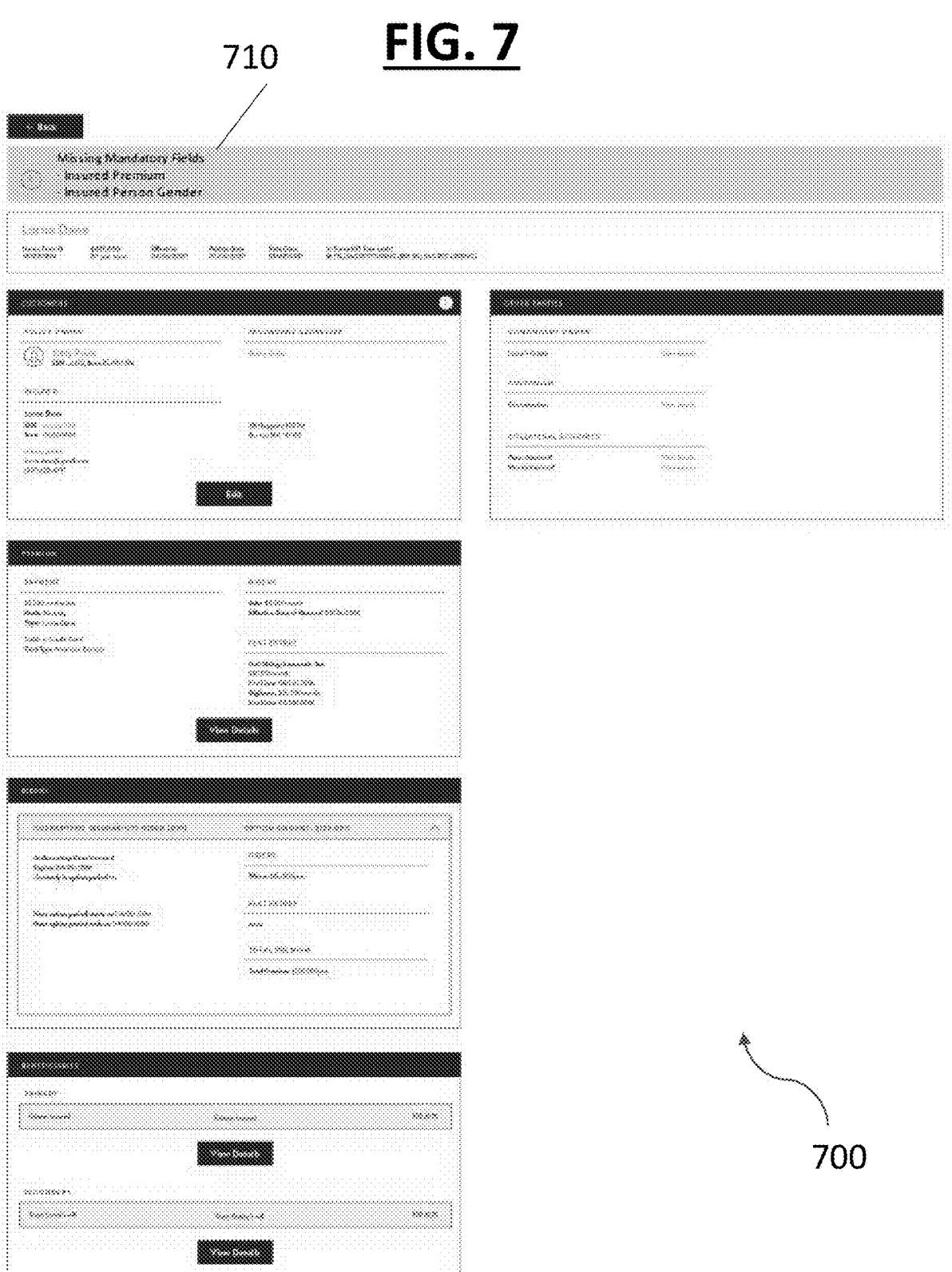
FIG. 7 illustrates a policy detail view of a visual UI tool for a Data Entry user, according to an embodiment.

FIG. 7 shows a policy detail view of UI visual tool 700 for a data entry user. In an example of data entry tool, after a data entry user is assigned a policy to be edited (e.g., by assigning the policy to themselves), the policy is listed in their personal inventory. By selecting the policy from their inventory, the data entry user is taken to the policy's details view 700. In the top area, a list 710 of missing mandatory fields is shown. In this case, the Insured person's SSN and gender the INSURED section may also be highlighted with a circled mark. The missing mandatory fields are highlighted (e.g., in red) in the INSURED section.

To correct the mandatory fields missing information, the data entry user can choose the Edit button in the corresponding INSURED section. The data entry user can also select View Details of the rest of the sections present on the policy details screen. For example, if they choose to View Details for the PREMIUM section, they will see all the fields in read-only mode, with no ability to edit them. In an embodiment, after supplying all mandatory fields with valid values of the policy, this policy is no longer shown in the Data Entry user's personal inventory and becomes available for QA users to add to their personal inventories for review (e.g., to assign to themselves for review).

Figure 8:
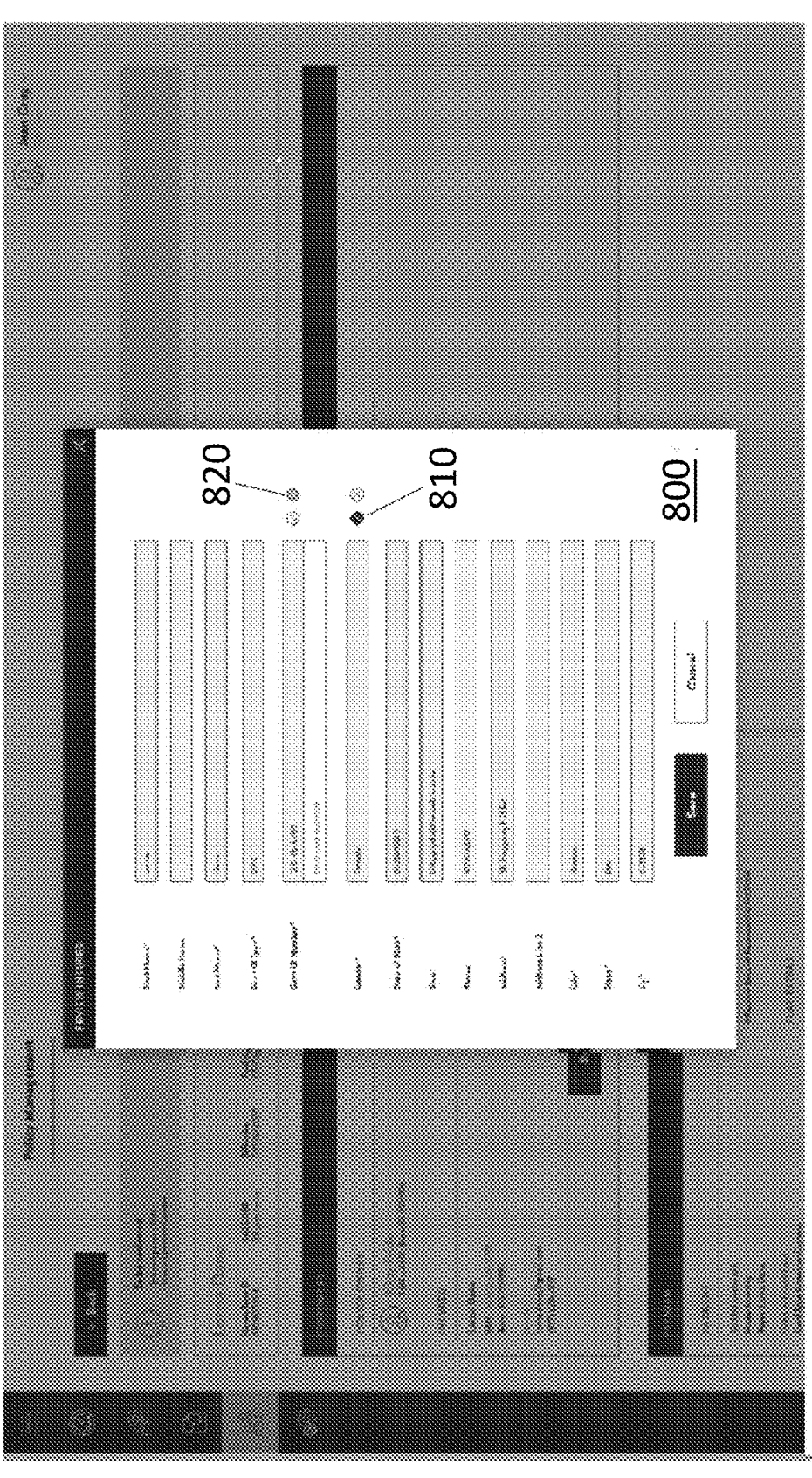
FIG. 8 illustrates a review interface of a visual UI tool for policy edit QA user review of field edits by a data entry user, according to an embodiment.

FIG. 8 shows a Review screen 800, a visual UI tool for policy edit QA user review of field edits by a data entry user. After a policy edit QA user assigns to themselves (or in an embodiment, is assigned by the system) a policy for review, the policy is listed in their personal inventory. By selecting the policy from their inventory, the policy edit QA user is taken to the Policy Detail view. The Policy Detail view may be similar to the Policy Detail view of FIG. 7. A top area of the screen lists To Be Reviewed fields. In an embodiment, these fields correspond to missing mandatory fields in the Policy Detail view of FIG. 7. In an embodiment, to approve or reject the edits that the Data Entry user made for the missing mandatory fields, the Policy Edit QA user can choose a Review button in the corresponding INSURED section. The Policy Edit QA user can also View Details of the rest of the sections present on the policy details screen.

For example, if they choose to View Details for the PRE-MIUM section, they will see all the fields in read-only mode, with no ability to approve/reject them.

FIG. 8 shows a Review interface 800 of a visual UI tool for Policy Edit QA user review of field edits by a data entry user. The Policy Edit QA user has an approve checkmark button 810 and a reject x button 820 displayed next to the fields that the data entry user has edited. The rest of the fields are presented in a read-only manner. In this case, the SSN and gender display the information the data entry user provided and display approve and reject buttons next to them. The Policy Edit QA user can choose to review (approve or reject) all edits at a time, or can review part of the edits and resume later with the rest.

In FIG. 8, the Policy Edit QA user has approved the gender edit but rejected the SSN edit. When rejecting an edit, an Enter Your Comment input form is displayed below the field. In an embodiment, entering a comment is mandatory if the Policy Edit QA user decides to reject an edit. The Policy Edit QA user will not be able to reject a field edit without saving a comment to explain their rejection and guide the data entry user on doing the re-work for that field. After supplying the rejection comment, the Policy Edit QA user can save their review. After the Policy Edit QA user has reviewed all fields, the policy is no longer shown in the user's personal inventory.

In the example shown, all field edits were reviewed but at least one is rejected. The policy may be automatically re-assigned to the last data entry user that interacted with it, and the policy returns automatically to that data entry user's personal inventory. In cases in which QA review resulted in no rejections, the policy is considered ready to be exported to the target administrative system database.

In an example of monitoring reviewer performance and model training in the method 500 of FIG. 5, the processor trains the computer model to monitor performance of different reviewers and optimize a queue of tasks accordingly. In an embodiment, after a few iterations of training, the platform can group tasks based on their attributes and send them to a particular reviewer or a group of reviewers. In an example, the platform determines that a group of reviewers are better at identifying a missing value associated with policy terms. As a result, when a subsequent insurance policy is missing a policy term, the platform assigns QA review of the policy term to the identified group.

In another example of monitoring reviewer performance and model training, the platform monitors reviewer inputs to detect patterns in how various missing values are identified and inputted. After a few iterations, the platform can automate various tasks instead of transmitting them to reviewers. In an instance of this technique, the platform determines that all of insurance policies from 1974 that were attributed to a particular agent are missing payment information. The platform also determines that all those missing payment information have been identified to be in an addendum of the insurance policy. As a result, when facing another insurance policy from 1974 attributed to that particular agent that is missing its payment information, the platform may automatically apply NLP techniques to the addendum to identify the missing policy term.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require, or imply, that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, with it being understood that software and control hardware can be designed to implement the systems and methods based on the description here.

When implemented in software, the functions may be stored as one or more instructions or codes on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A method comprising:

receiving, by a processor, a request to generate an electronic file representing attributes of an insurance policy depicted within an electronic document, the request indicating a target computing system configured to execute an analytical protocol using the electronic file, identifying, by the processor, at least one missing object within the electronic document by executing a visual object recognition protocol upon the electronic document, the missing object representing an attribute of the insurance policy;

determining, by the processor using the attribute of the insurance policy, at least one employee computing device within a plurality of employee computing devices to correct the missing object, wherein the at least one employee computing device is identified based on historical performance data as being associated with a likelihood of correcting missing objects with similar attributes to the at least one missing object within the electronic document that satisfies a threshold;

populating, by the processor, a graphical user interface accessed by the at least one employee computing device within the plurality of employee computing devices by displaying an indication of the missing object within the electronic document and a description of the at least one missing object;

upon receiving a request from an employee computing device within the at least one plurality, of employee computing device devices, displaying, by the processor on the graphical user interface accessed by the employee computing device, an input element corresponding to the missing object;

generating, by the processor, the electronic file corresponding to the electronic document using an input to the input element received via the employee computing device;

monitoring, by the processor, at least one task executed by the employee computing device to identify the input to the input element; and training, by the processor, a computer model configured to automate identification of the input received via the employee computing device, whereby the computer model ingests data associated with at least one task executed by the employee computing device to identify a second missing object similar to the at least one missing object within the electronic document.

2. The method of claim 1, wherein the computer model is a machine learning model.

3. The method of claim 1, wherein the computer model is further trained to identify a suitable employee computing device from within the at least one employee computing device associated with the second missing object.

4. The method of claim 1, wherein the at least one task executed by the employee computing device corresponds to a user role selected from group product analyst, data entry associate, policy edit quality assurance associate, and business analyst.

5. The method of claim 1, wherein the at least one missing object within the electronic document satisfies a predetermined criteria indicating a likelihood of acceptance by the target computing system.

6. The method of claim 1, wherein the at least one missing object corresponds to at least one of policy-level data including a face amount, coverages, conversion rights, rules and riders, or issue age; party-level data including parties associated with the electronic document; transaction-level data including data associated with history of the electronic document or payment schedule; or agent-level data including distribution data associated with the electronic document.

7. The method of claim 1, wherein a format of the electronic file is compatible with a formatting requirement of the target computing system.

8. The method of claim 1, further comprising:

normalizing, by the processor, at least one value identified within the electronic document.

9. The method of claim 8, further comprising sending the data associated with at least one task executed by the employee computing device to an Extract Transform Load (ETL) engine for normalizing the at least one value identified within the electronic document.

10. The method of claim 9, further comprising inputting a configuration file to the ETL engine, wherein the configuration file comprises parameters for transforming a plurality of the attributes of the insurance policy depicted within the electronic document to corresponding attributes of the electronic file having a configuration that is compatible with the target computing system.

* * * * *